(12) United States Patent
Yang

(10) Patent No.: US 7,185,862 B1
(45) Date of Patent: Mar. 6, 2007

(54) MOUNTING PLATFORM ASSEMBLY FOR A STAND DEVICE

(76) Inventor: Jen Yu Yang, No 6, Lane 158, Nanyang Rd., Fongyuan City, Taichung County, 420 (TW)

( * ) Notice: Subject to any disclaimer, the term of this patent is extended or adjusted under 35 U.S.C. 154(b) by 36 days.

(21) Appl. No.: 11/242,012

(22) Filed: Oct. 4, 2005

(51) Int. Cl.
*F16M 11/04* (2006.01)

(52) U.S. Cl. .............................. 248/187.1; 248/221.11; 396/428

(58) Field of Classification Search ............. 248/187.1, 248/176.3, 278.1, 221.11; 396/419, 420, 396/422, 428
See application file for complete search history.

(56) References Cited

U.S. PATENT DOCUMENTS

| | | | | |
|---|---|---|---|---|
| 2,834,567 A | * | 5/1958 | Young ..................... | 248/187.1 |
| 2,966,107 A | * | 12/1960 | Sanderson ............... | 248/187.1 |
| 3,006,052 A | * | 10/1961 | Stickney et al. ......... | 248/187.1 |
| 3,612,462 A | * | 10/1971 | Mooney et al. .......... | 248/316.4 |
| 4,979,709 A | * | 12/1990 | Ishikawa ................. | 248/187.1 |
| 6,196,504 B1 | * | 3/2001 | Lemke ..................... | 248/187.1 |
| 6,234,690 B1 | * | 5/2001 | Lemieux .................... | 396/419 |
| 6,773,172 B1 | * | 8/2004 | Johnson et al. ............. | 396/428 |
| 6,827,319 B2 | * | 12/2004 | Mayr ...................... | 248/187.1 |

* cited by examiner

*Primary Examiner*—Korie Chan
(74) *Attorney, Agent, or Firm*—Rabin & Berdo, P.C.

(57) ABSTRACT

A mounting platform assembly for a stand device includes a connecting platform having two parallel engaging blocks projecting from a bottom surface thereof, each having a positioning hole and forming a slope on an outward face thereof; and a fixing base having two engaging ribs projecting from a top surface thereof, each forming a sliding groove on the top surface of the fixing base corresponding to the slope of each engaging block, and the fixing base having a positioning means including an engaging button and a push rod. When a conical portion of the push rod abuts against a bottom end of the engaging button, the other end of the engaging button projects from the top surface of the fixing base to engage with the positioning hole of the engaging block, thereby achieving the positioning and fixing of the connecting platform.

7 Claims, 6 Drawing Sheets

MOUNTING PLATFORM ASSEMBLY FOR A STAND DEVICE

BACKGROUND OF THE INVENTION

1. Field of the Invention

The present invention relates to a mounting platform assembly for a stand device, which is capable of fast positioning and fixing an object, such as a camera, to the stand device.

2. The Prior Arts

In general, when using a camera or video camera to photo or shoot, a user usually holds the camera or video camera by hands. However, the hands of the user may shake or sway so as to make the resulted pictures vague. Therefore, in order to keep the stability in taking a photograph, a mounting platform assembly is often used to fix the camera to a stand device. After the camera has been fixed, it can be used to stably shoot by time lapse or remote control. Especially, some bulkier and heavier cameras or video cameras need to be supported by stand devices to smooth the shooting. Also, the camera to be fixed to a stand device is often mounted to a mounting platform assembly.

Referring to FIG. 1, a conventional mounting platform assembly 10 comprises a supporting base 11, a connecting platform 12 and a screw rod 13. The supporting base 11 is mounted on general stand devices. The connecting platform 12 is mounted on the supporting base 11. The screw rod 13 is projected from a top surface of the connecting platform 12, such that the screw rod 13 can be threadedly connected with a screw hole or a connecting member provided on a bottom of a camera. In this way, the fixing of the camera is achieved.

However, in order to fix a camera to the conventional mounting platform assembly 10, the user must align the screw hole provided on the bottom of the camera with the screw rod 13, such that the screw rod 13 can be threaded into the screw hole and thus be fixed thereto. When detaching the camera from the mounting platform assembly 10, the user needs to operate conversely such that the screw rod 13 can be threaded out of the screw hole. As a result, no matter assembling or disassembling, the above operation is very inconvenient. In some cases having special requirements, for example, a reporter or ecological photographer may miss very important scenes if he or she does not complete the assembling of the camera as soon as possible and timely take the shoot. Therefore, it is necessary for the photographers to have a stand device with a mounting platform assembly that can be fast assembled/disassembled and safely fixed with the camera. Although a mounting platform assembly, which has been changed to a sliding-type structure and can be fast assembled with a camera, is proposed, they are not provided with any safety positioning means. Thus, the camera connected thereon is liable to slide out of the mounting platform assembly. It still has a problem not able to achieve the safe fixation of the camera.

SUMMARY OF THE INVENTION

The objective of the present invention is to provide a mounting platform assembly for a stand device, which is capable of fast positioning and fixing an object, such as a camera, to the stand device.

To achieve the above-mentioned objective, a mounting platform assembly for a stand device is mounted on a supporting base and comprises a connecting platform provided with two parallel engaging blocks projecting from a bottom surface thereof, wherein an outward face of each engaging block forms a slope, each engaging block is provided with a positioning hole; and a fixing base having two engaging ribs projecting from a top surface thereof, wherein each engaging rib forms a sliding groove on the top surface of the fixing base corresponding to the slope of each engaging block, the fixing base is provided laterally with a transverse notch in communication with a through hole perpendicularly provided on the fixing base, the through hole receives a first elastic element and an engaging button, the notch receives a second elastic element and a push rod, a bottom end of the engaging button abuts on the push rod; and wherein the push rod has a slender portion and an conical portion near a middle section thereof, when the conical portion abuts against the bottom end of the abutting button, the other end of the engaging button projects from the top surface of the fixing base to engage with the positioning hole of the engaging block; when pushing the push rod so as to make the slender portion abut against the bottom end of the engaging button, the engaging button is retracted in the through hole due to the elastic force of the first elastic element.

Further, a bottom surface of the fixing base is provided with a penetrating hole in communication with the notch. The penetrating hole is threadedly connected with a screw rod, and one end of the screw rod projects into the notch and exactly abuts against the push rod to limit the moving range of the push rod.

Therefore, in practical application for the present invention, users can first connect the connecting platform to a screw hole or a connecting member on a camera by a screw. Then, the connecting platform and the camera directly slide into the sliding grooves of the fixing base. At this time, push the push rod forward to make the engaging button retract in the through hole of the fixing base. After the connecting platform slides to a proper position, release the push rod such that the engaging button projects into and engages with the positioning hole of the connecting platform. In this way, the connecting platform can be fast assembled/disassembled, and the stability in assembling can be ensured. Further, the accidental sliding of the connecting platform and the camera can be prevented.

The present invention will become more obvious from the following description when taken in connection with the accompanying drawings, which show, for purposes of illustration only, preferred embodiments in accordance with the present invention.

DETAILED DESCRIPTION OF THE PREFERRED EMBODIMENT

Figure 2:
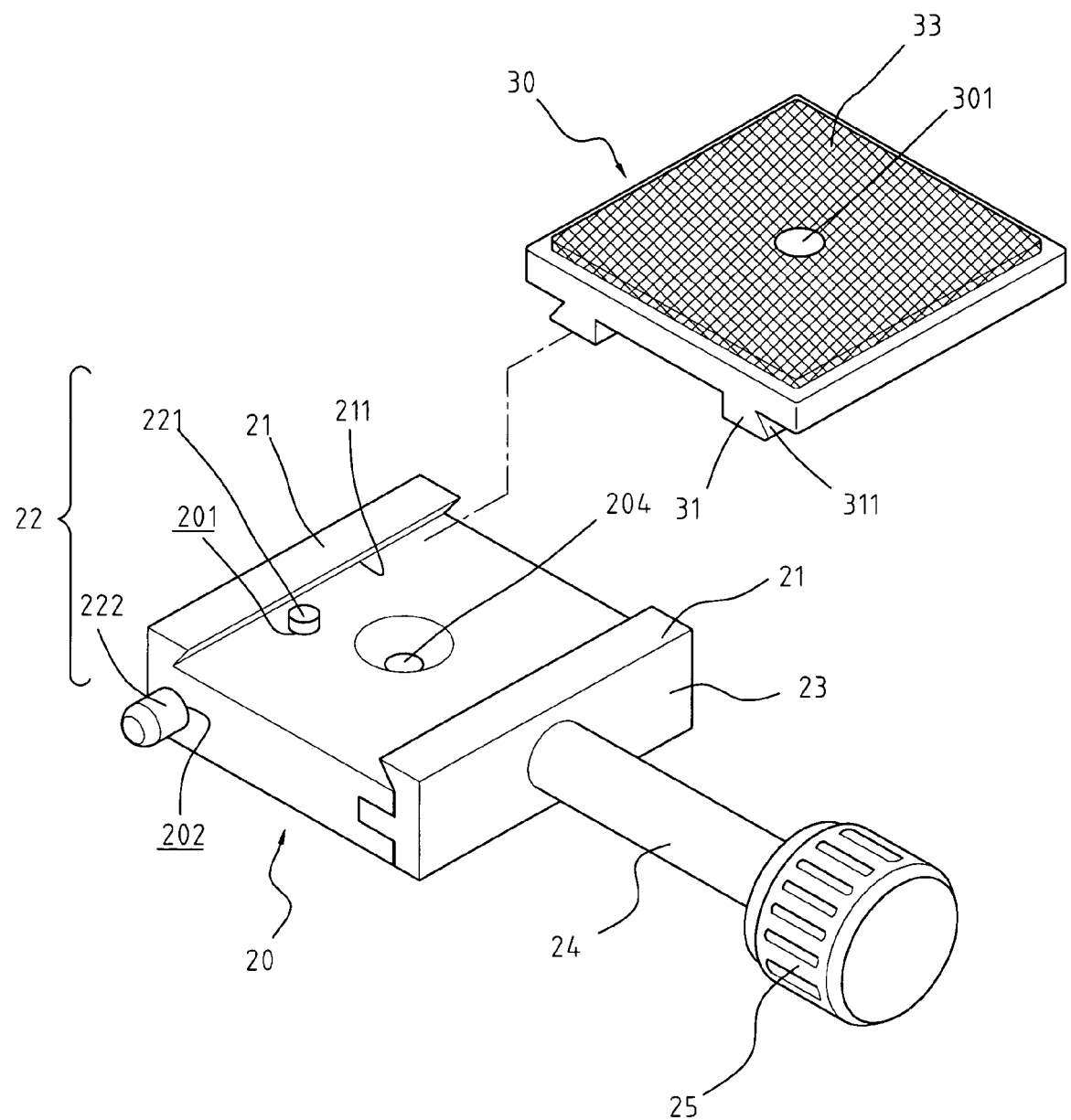
FIG. 2 is a schematic view of a mounting platform assembly for a stand device in accordance with the present invention.

With reference to FIG. 2, a mounting platform assembly for a stand device in accordance with the present invention comprises a fixing base 20 and a connecting platform 30. The connecting platform 30 having two male engaging blocks 31 engages with two sliding grooves 211 of the fixing base 20; and, by the engagement of a positioning hole 32 on the male engaging block 31 and an engaging button 221 on a top surface the fixing base 20, the connecting platform 30 can be firmly fixed on the fixing base 20.

Figure 3:
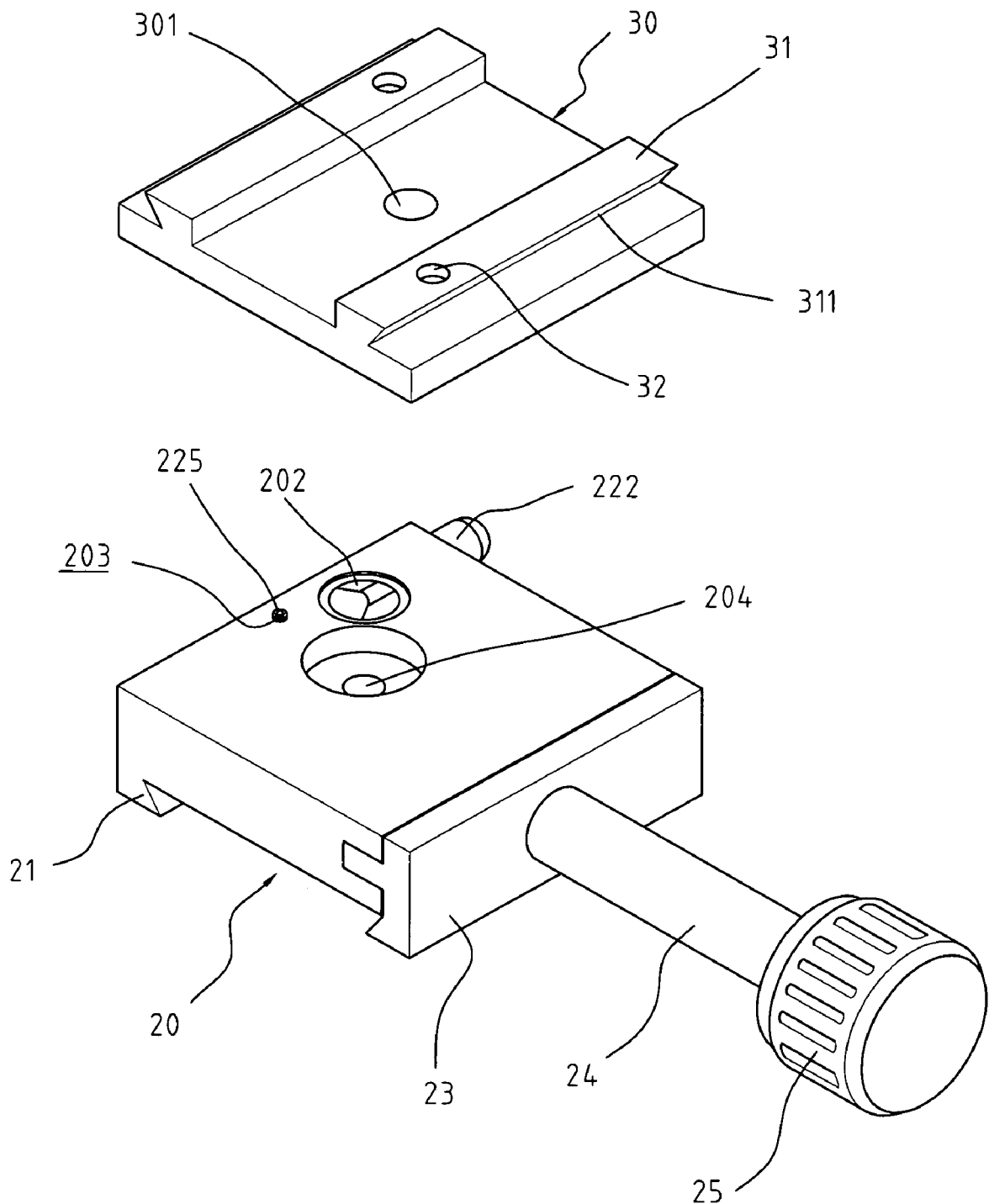
FIG. 3 is a schematic view showing a back of the mounting platform assembly of the present invention.

Next, with reference to FIGS. 2 and 3, the fixing base 20 is provided with two engaging ribs 21 projecting from the top surface thereof. Faces of the engaging ribs 21 opposite to each other are provided with a slope and thus form a sliding groove 211 on the top surface of the fixing base 20, respectively. The fixing base 20 is laterally provided with a transverse notch 202 in communication with a through hole 201 perpendicularly provided on the fixing base 20. The through hole 201 receives an engaging button 221, and the notch 202 receives a push rod 222. The engaging button 221 and the push rod 222 forms a positioning means 22 to position the connecting platform 30.

The engaging rib 21 can be fixedly provided, or provided on a movable T-shaped engaging block 23 as shown in this embodiment. In this case, the fixing base 20 is provided with an inserting groove (not labeled) corresponding to the T-shaped engaging block 23. A spring (not shown) is provided between the T-shaped engaging block 23 and the inserting groove. The T-shaped engaging block 23 is also provided with a fixing rod 24 having a knob 25 to firmly mount the T-shaped engaging block 23 to the fixing base 20.

Figure 1:
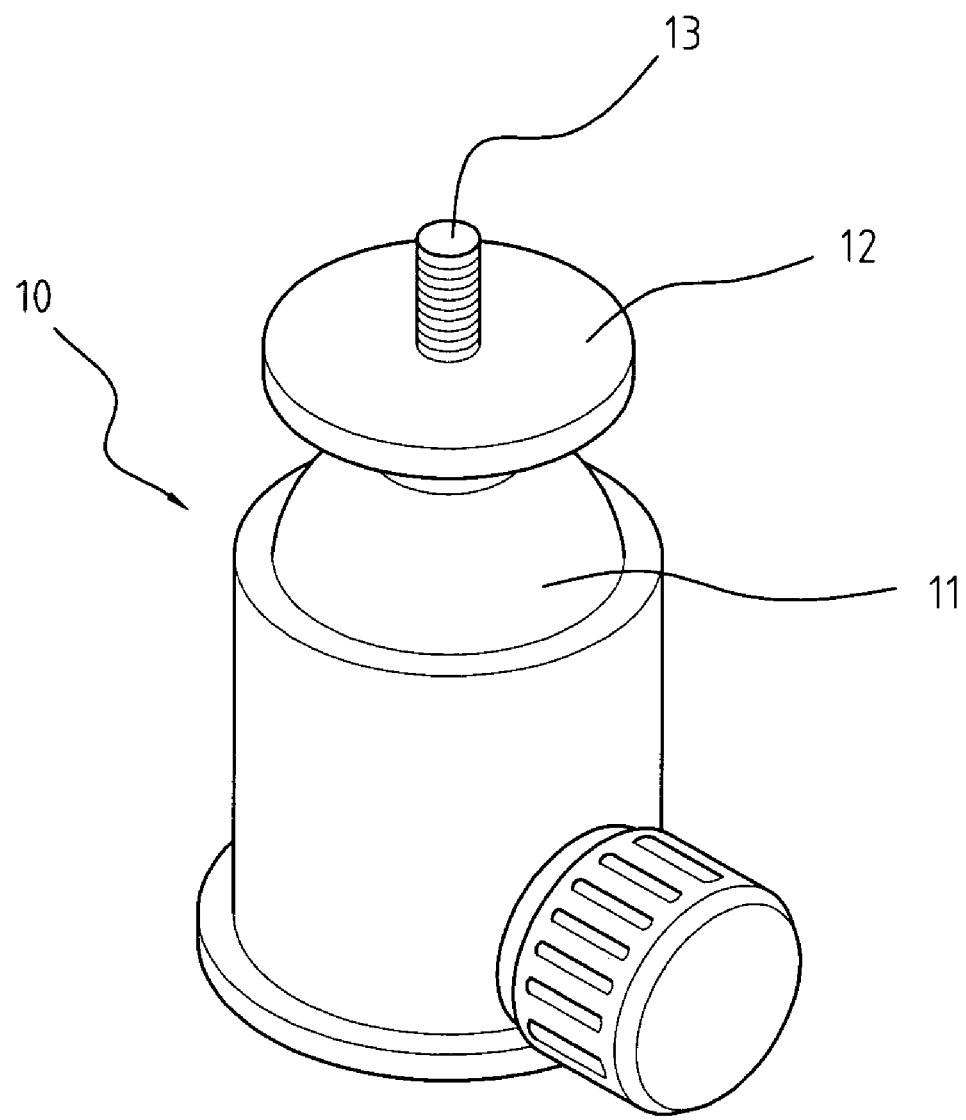
FIG. 1 is a perspective view of a mounting platform assembly for a stand device in accordance with a prior art.

Further, a bottom surface of the fixing base 20 is provided with a penetrating hole 203 in communication with the notch 202, which is threadedly connected with a screw rod 225. The fixing base 20 is provided with a receiving hole 204 penetrating through the fixing base 20, such that the fixing base 20 can be fixed to the supporting base 11 by a screw (see FIG. 1).

The connecting platform 30 is provided with two parallel engaging blocks 31 projecting from a bottom surface thereof. The outward face of each engaging block 31 forms a slope 311 corresponding to the sliding groove 211. Each engaging block 31 is provided with a positioning hole 32 for engaging with the engaging button 221 of the fixing base 20. All the two engaging blocks 31 and the two positioning holes 32 can be symmetrically provided. In this way, whether the inserting direction of the connecting platform 30 is reverse or not, the connecting platform 30 can be well assembled. A connecting hole 301 is provided in a center of the connecting platform 30, such that the user can connect the connecting platform 30 to a screw hole or a connecting member on a camera by a screw. Further, in order to prevent the mounting platform assembly from scraping the camera and increase the stability in connection, a soft pad 33 is further provided on a top surface of the connecting platform 30 for a cushion. The pad 33 can be made by but not limited to rubber and other soft elastic materials.

Figure 4:
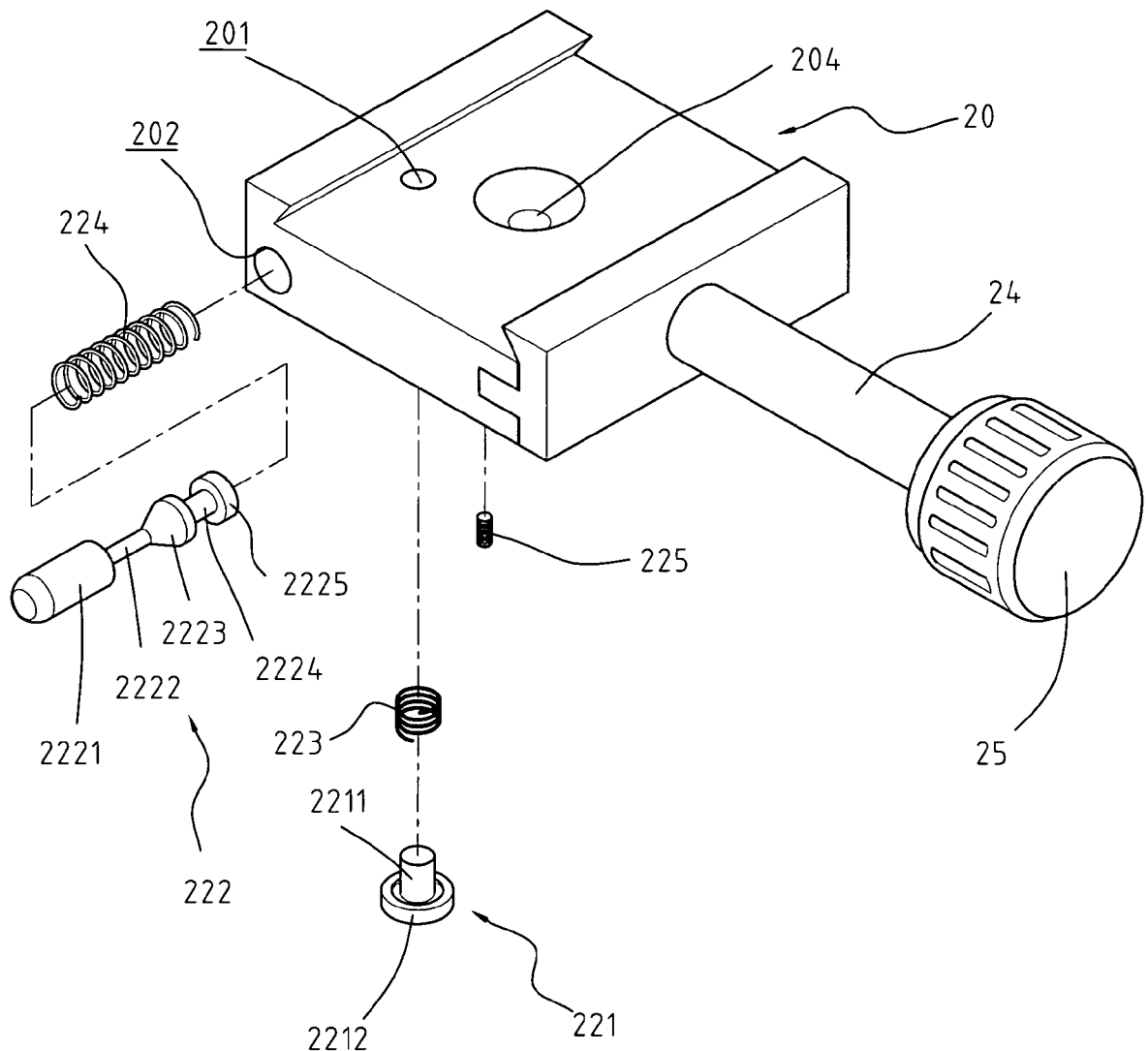
FIG. 4 is an exploded view of a fixing base of the present invention.

With reference to FIG. 4, a positioning means 22 mainly comprises an engaging button 221 and a push rod 222. The engaging button 221 comprises an engaging post 2211 and an abutting block 2212. The engaging button 221 is received in the through hole 201, which has an upper portion and a lower portion. The upper portion of the through hole 201 allows the engaging post 2211 to move therein, while an outer diameter of the lower portion of the through hole 201 is larger than and allows the abutting block 2212 to move therein. In assembling, a first elastic element 223 is inserted into the through hole 201 from a lower end thereof; then, the engaging button 221 with the engaging post 2211 facing upward is inserted into the through hole 201.

The push rod 222 comprises in order a push end 2221 exposed to a side face of the fixing base 20 after assembled, a slender portion 2222, a conical portion 2223, a brake portion 2224, and an abutting end 2225. After the engaging button 221 is assembled, the engaging button 221 is pressed toward the smaller end of the through hole 201. As a result, after the abutting block 2212 of the engaging button 221 departs from the notch 202 (see FIG. 5), the second elastic element 224 is inserted into the notch 202, and then, the push rod 222 is inserted into the notch 202.

Figure 5:
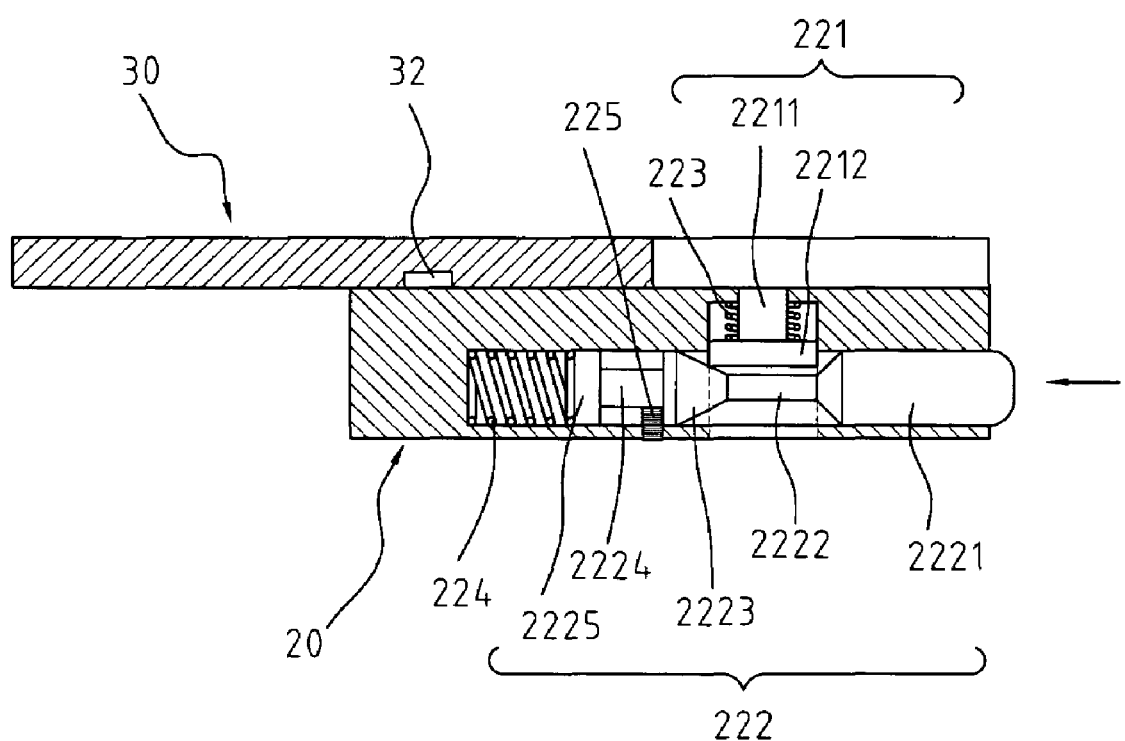
FIG. 5 is a sectional view showing a movement of a connecting platform of the present invention when assembling.

Finally, the push rod 222 is further pushed forward, such that the brake portion 2224 corresponds to the penetrating hole 203 (see FIGS. 3 and 5). Then, the screw rod 225 is threaded into the penetrating hole 203, while one end of the screw rod 225 projects into the notch 202 to abut the push rod 222 between the abutting end 2225 and the conical portion 2223. As a result, the push rod 222 can only slide in a length range of the brake portion 2224 for restricting the push rod 222 not to bounce out of the notch 202. The above-mentioned first elastic element 223 and the second elastic element 224 are but not limited to springs.

With reference to FIG. 5, as described in the above, a camera should be first connected to the connecting platform 30, and then the connecting platform 30 is mounted on the fixing base 20. In assembling, the engaging blocks 31 of the connecting platform 30 are slid into the sliding grooves 211 of the fixing base 20 (see FIG. 2); and then, presses the push end 2221 of the push rod 222 toward the second elastic element 224 so as to make the slender portion 2222 align with the engaging button 221. At this time, the abutting block 2212 will abut against the slender portion 2222 due to the elastic force of the first elastic element 223. In this way, the engaging post 2211 can be retracted beneath the top surface of the fixing base 20, such that the connecting platform 30 can slide over the engaging post 2211 and position at the proper position.

Figure 6:
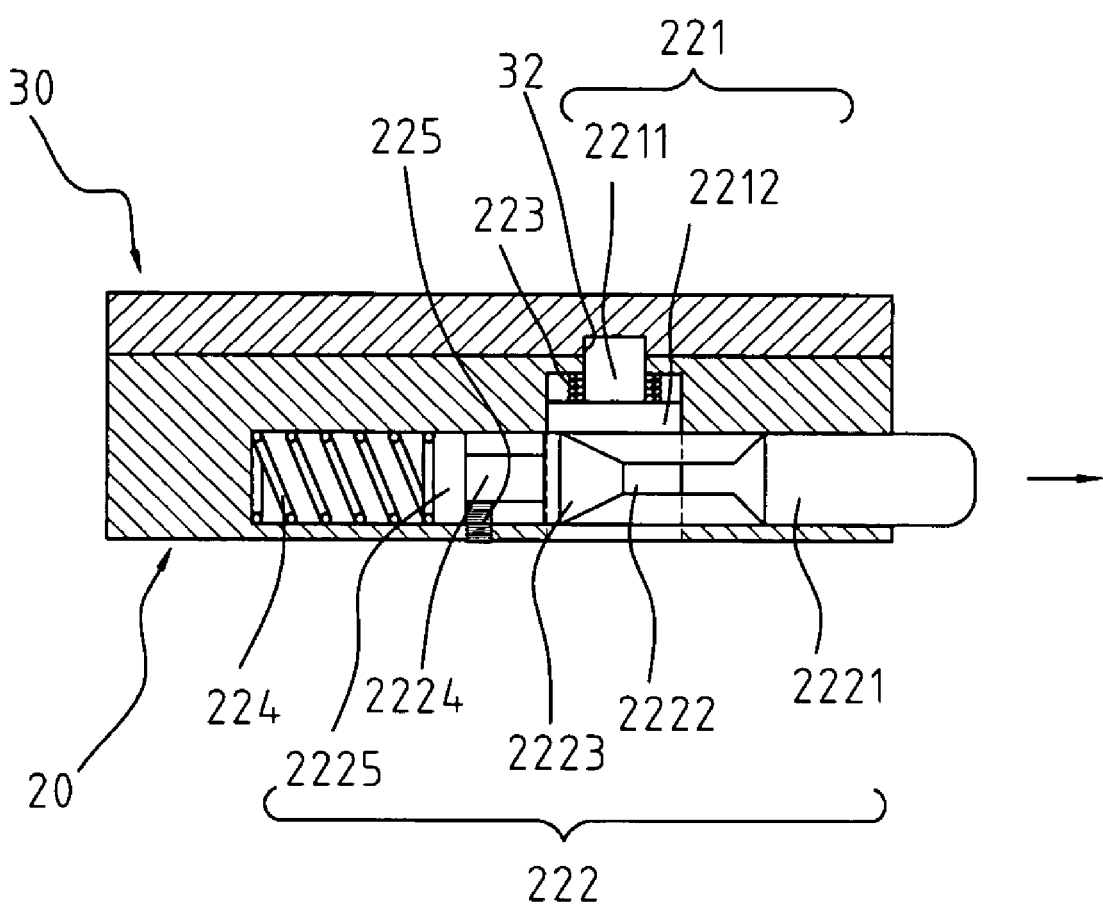
FIG. 6 is a sectional view showing that the connecting platform of the present invention is fixed to the fixing base thereof after assembled.

With reference to FIG. 6, after the connecting platform 30 has located in position on the fixing base 20, release the push rod 222. The push rod 222 will move backward until the abutting end 2225 touches the screw rod 225, due to the elastic force of the second elastic element 224. During the backward movement of the push rod 222, a conical surface of the conical portion 2223 gradually pushes upward the abutting block 2212 of the engaging button 221. When the push rod 222 moves backward to the proper position, the engaging button 221 is pushed upward to a highest point. At this time, the engaging post 2211 projects from the top surface of the fixing base 20 to engage with the positioning hole 32 of the connecting platform 30, such that the connecting platform 30 can be suitably positioned and fixed. When intending to disassemble, a simply detachment of the connecting platform 30 from the fixing base 20 can be carried out by the above operations in reverse order. Therefore, the present invention can be fast assembled/disassembled, and increase the stability in assembling by utilizing the positioning means. Further, the accidental sliding of the connecting platform 30 and the camera can be prevented.

What is claimed is:

1. A mounting platform assembly for a stand device, mounted on a supporting base and comprising:
   a connecting platform provided with two parallel engaging blocks projecting from a bottom surface thereof, wherein an outward face of each engaging block forms a slope, each engaging block is provided with a positioning hole; and a fixing base having two engaging ribs projecting from a top surface thereof, wherein each engaging rib forms a sliding groove on the top surface of the fixing base corresponding to the slope of each engaging block, the fixing base is provided laterally with a transverse notch in communication with a through hole perpendicularly provided on the fixing base, the through hole receives a first elastic element and an engaging button, the notch receives a second elastic element and a push rod, a bottom end of the engaging button abuts on the push rod; and wherein the push rod has a slender portion and an conical portion near a middle section thereof, when the conical portion abuts against the bottom end of the abutting button, the other end of the engaging button projects from the top surface of the fixing base to engage with the positioning hole of the engaging block; when pushing the push rod so as to make the slender portion abut against the bottom end of the engaging button, the engaging button is retracted in the through hole of the fixing base due to the elastic force of the first elastic element.

2. The mounting platform assembly for a stand device according to claim 1, wherein a bottom surface of the fixing base is provided with a penetrating hole in communication with the notch, the penetrating hole is threadedly connected with a screw rod, and one end of the screw rod projects into the notch and exactly abuts against the push rod to limit the moving range of the push rod.

3. The mounting platform assembly for a stand device according to claim 2, wherein the push rod has a brake portion adjacent to the conical portion and an abutting end next to the brake portion, the screw rod is located at the brake portion.

4. The mounting platform assembly for a stand device according to claim 1, wherein the fixing base is provided with a receiving hole penetrating through the fixing base.

5. The mounting platform assembly for a stand device according to claim 1, wherein one of the engaging ribs is provided on a T-shaped engaging block, the fixing base is provided with an inserting groove corresponding to the T-shaped engaging block, and the T-shaped engaging block is provided with a fixing rod having a knob.

6. The mounting platform assembly for a stand device according to claim 1, wherein the connecting platform is provided with a connecting hole.

7. The mounting platform assembly for a stand device according to claim 1, wherein the connecting platform is further provided with a pad.

* * * * *